United States Patent
Lee

(12) 
(10) Patent No.: US 6,244,163 B1
(45) Date of Patent: Jun. 12, 2001

(54) BAKING OVEN TURNING OVER OBJECTS BEING BAKED AT SET REGULAR TIMES

(76) Inventor: Ming-Tsung Lee, P.O. Box 90, Tainan City (TW)

( * ) Notice: Subject to any disclaimer, the term of this patent is extended or adjusted under 35 U.S.C. 154(b) by 0 days.

(21) Appl. No.: 09/594,567

(22) Filed: Jun. 15, 2000

(51) Int. Cl.⁷ .................................................. A47J 37/00
(52) U.S. Cl. ................... 099/327; 099/419; 099/421 H; 099/427; 099/450; 219/400
(58) Field of Search .................. 099/326–335, 099/339, 340, 419–421 V, 444–450, 400, 401, 483; 126/25 R, 9 R, 41 R; 219/386, 400, 401

(56) References Cited

U.S. PATENT DOCUMENTS

| | | | |
|---|---|---|---|
| D. 349,419 | * | 8/1994 | Koopman ............................... D7/338 |
| 3,866,526 | * | 2/1975 | Eng ....................................... 99/446 X |
| 3,901,136 | * | 8/1975 | Wilson et al. .......................... 99/352 |
| 4,181,074 | * | 1/1980 | Hieb ................................. 99/421 HH |
| 4,332,188 | * | 6/1982 | Rhear ..................................... 99/340 |
| 4,750,414 | * | 6/1988 | Dohrs ..................................... 99/419 |
| 4,810,856 | * | 3/1989 | Jovanovic ............................. 219/401 |
| 4,924,766 | * | 5/1990 | Hitch ................................. 99/421 H |
| 4,979,439 | * | 12/1990 | Ferron-Zepeda ................... 99/421 R |
| 5,323,692 | * | 6/1994 | Grzywna et al. .................. 99/421 H |
| 5,485,780 | * | 1/1996 | Koether et al. ....................... 219/400 |
| 5,562,022 | * | 10/1996 | Schmid et al. .......................... 99/419 |
| 5,586,489 | * | 12/1996 | Fraga ..................................... 99/419 |

* cited by examiner

*Primary Examiner*—Timothy F. Simone

(57) ABSTRACT

A baking oven turning over objects being baked at set regular times includes a heating tube fixed in an upper portion of the interior of the baking oven, and a baking frame located in an intermediate horizontal portion, a control switch device, a speed reduced motor and a time set adjusting switch circuit board fixed in the baking oven. The time set adjusting switch circuit board turns on and off power to stop and operate the motor and subsequently controlling the control switch device to automatically rotate to turn the baking frame over to permit the objects being baked evenly to get the best result.

8 Claims, 4 Drawing Sheets

BAKING OVEN TURNING OVER OBJECTS BEING BAKED AT SET REGULAR TIMES

BACKGROUND OF THE INVENTION

This invention relates to a baking oven regularly turning over objects being baked at a set time, particularly to one having a time set adjusting switch circuit board for turning on and off power at set regular times, controlling stoppage and operation of a speed reduced motor, with the control switch automatically turning and subsequently turning a baking frame with objects being baked, which receive heat evenly and be baked evenly.

A conventional baking oven shown in FIG. 1 includes plural electric heating tubes 10 located laterally in the oven, and one or more baking frames 11 inside for receiving objects to be baked thereon. But the side of the objects being baked directly receive heat produced by the heating tubes 11 and baked easily, but the other side of the objects not receiving heat directly from the heating tubes 11 is not so easily baked enough. So if object being baked is to be baked evenly, it has to be turned over incessantly. But the baking oven 1 has the interior chamber with high temperature for baking, making turning the objects being baked not easily operated, and endangering a user to be burned.

SUMMARY OF THE INVENTION

The objective of the invention is to offer a baking oven turning over objects being baked at set regular times, baking the objects evenly, unnecessary to turning around manually. The feature of the invention is a baking frame having two ends provided respectively with a support shaft, and one of the two ends inserted in a side wall of the baking oven, and a control switch device and a speed reduced motor fixed on the other side wall, and the control switch has a turning shaft for a support shaft of the other end of the baking frame to insert therein, and a time set adjusting switch circuit board fixed in the baking oven.

BRIEF DESCRIPTION OF DRAWINGS

This invention will be better understood by referring to the accompanying drawings, wherein.

DETAILED DESCRIPTION OF THE PREFERRED EMBODIMENTS

Figure 1:
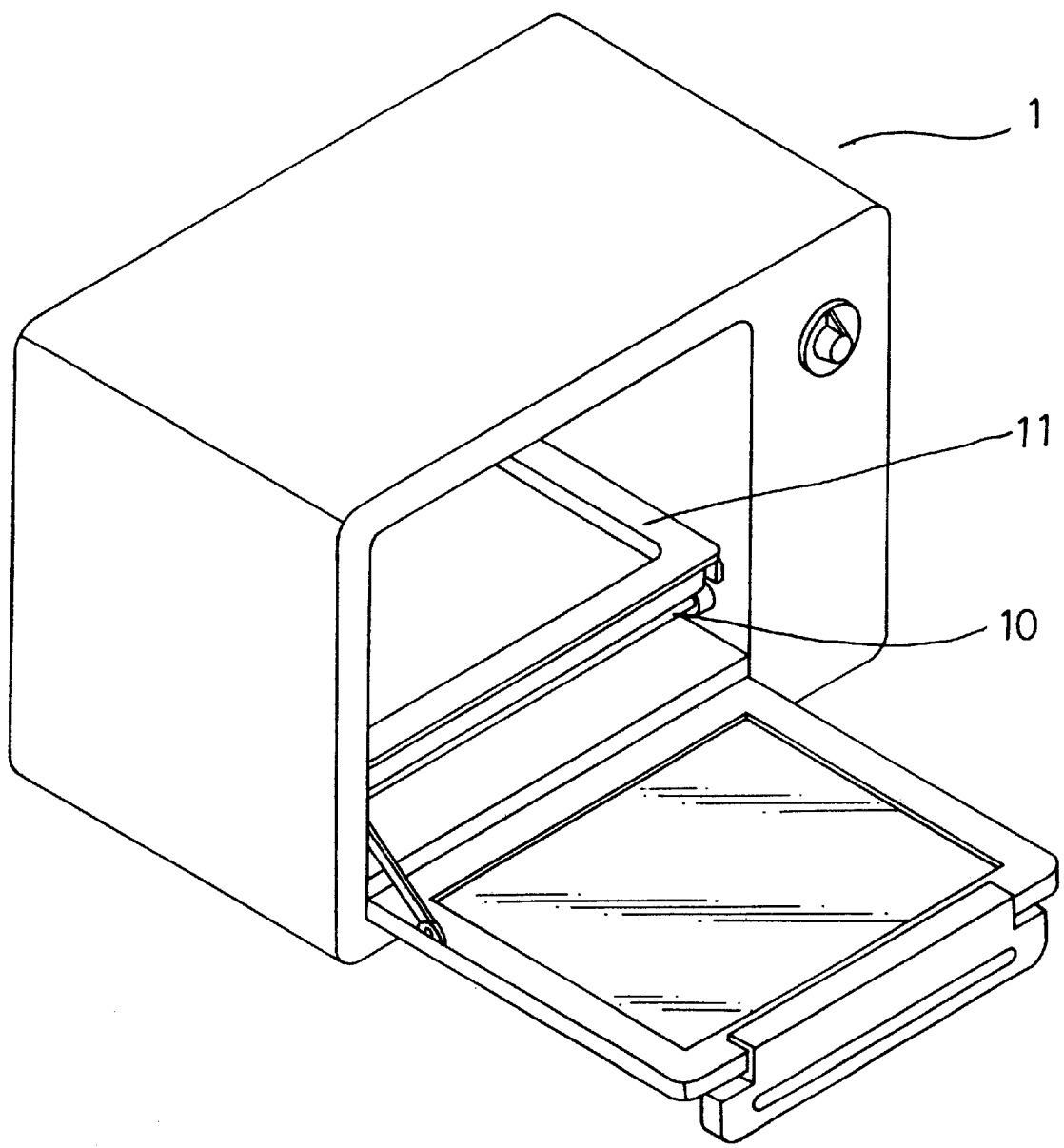
FIG. 1 is a perspective view of a conventional baking oven.
Figure 2:
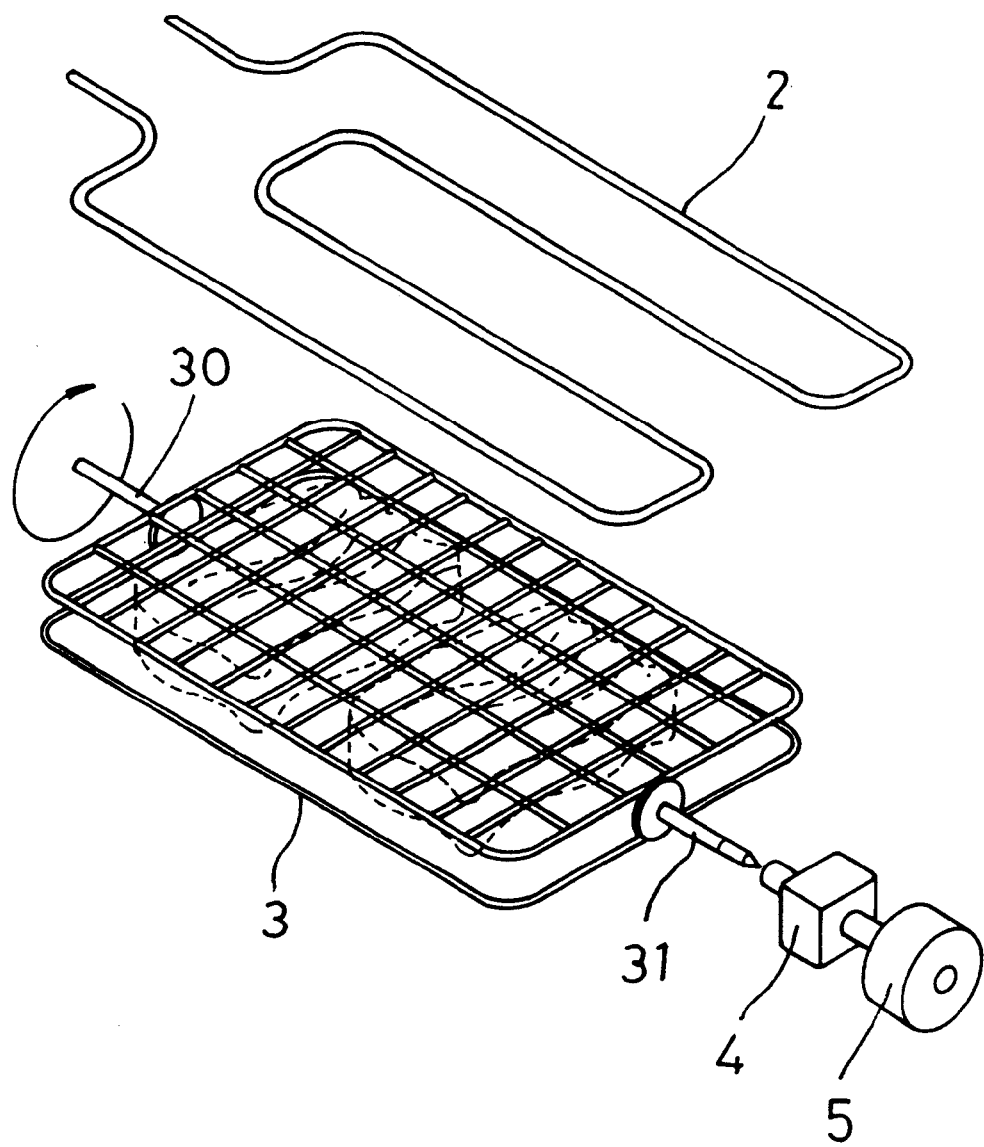
FIG. 2 is a perspective view of components in a baking oven in the present invention.

A preferred embodiment of a baking oven turning over objects being baked at set regular times in the present invention, as shown in FIG. 2, includes an electric heating tube 2 located in an upper portion in the interior of a baking oven, a baking frame 3 consisting two plates or nets separated with a gap. The frame 3 has two ends provided respectively with a support shaft 30, 31 extending outward. The support shaft 30 insert in an inner surface of a vertical side wall of the baking oven, and a control switch 4 and a speed reduced motor 5 fixed an the other vertical side wall and connected electrically with each other. The control switch has turning shaft 40 fixed at one end, and the support shaft 31 inserting in the turning shaft 40, combining the support shaft 31, the control switch device 4 and the motor 5 together with the same axis. Further, a time set adjusting circuit board 6 is fixed in the baking oven.

Figure 3:
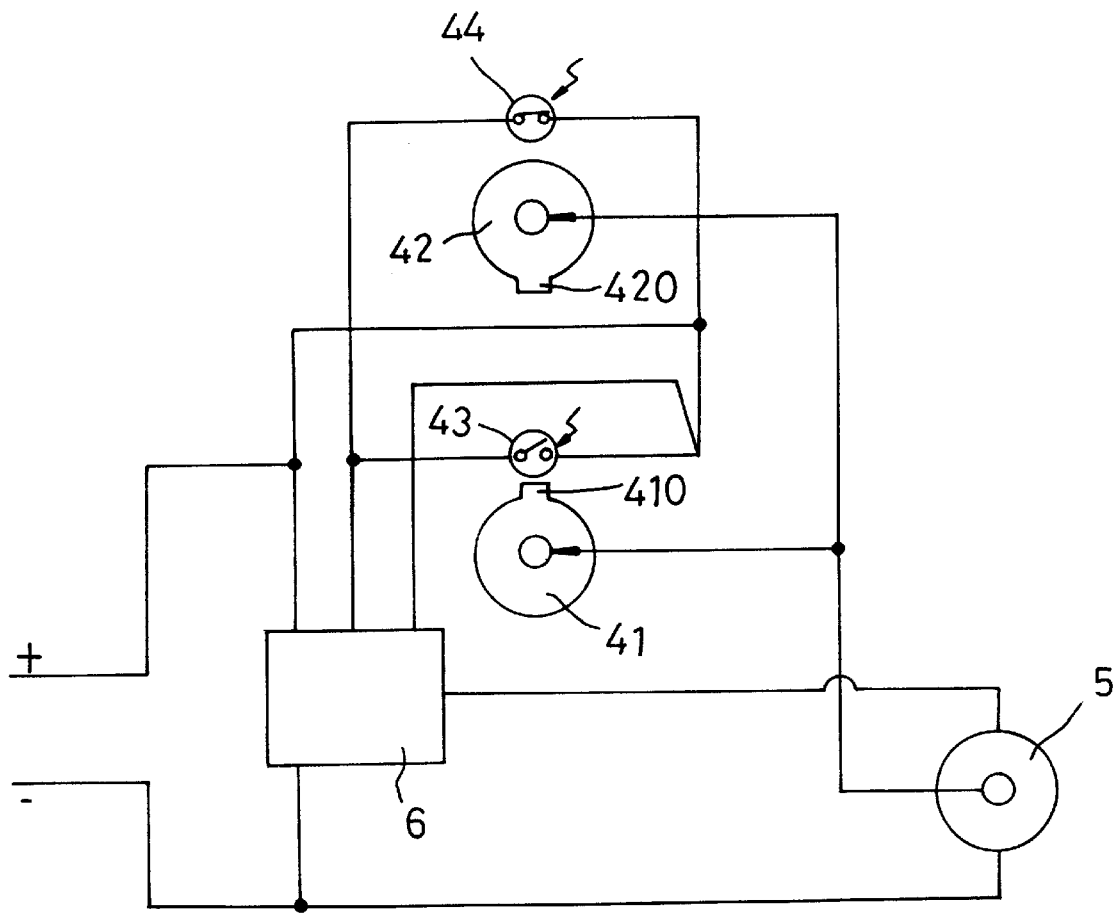
FIG. 3 is a diagram of an electric circuit of the baking oven in the present invention; and, FIG. 4 is a diagram of another electric circuit of the baking oven in the present invention.
Figure 4:
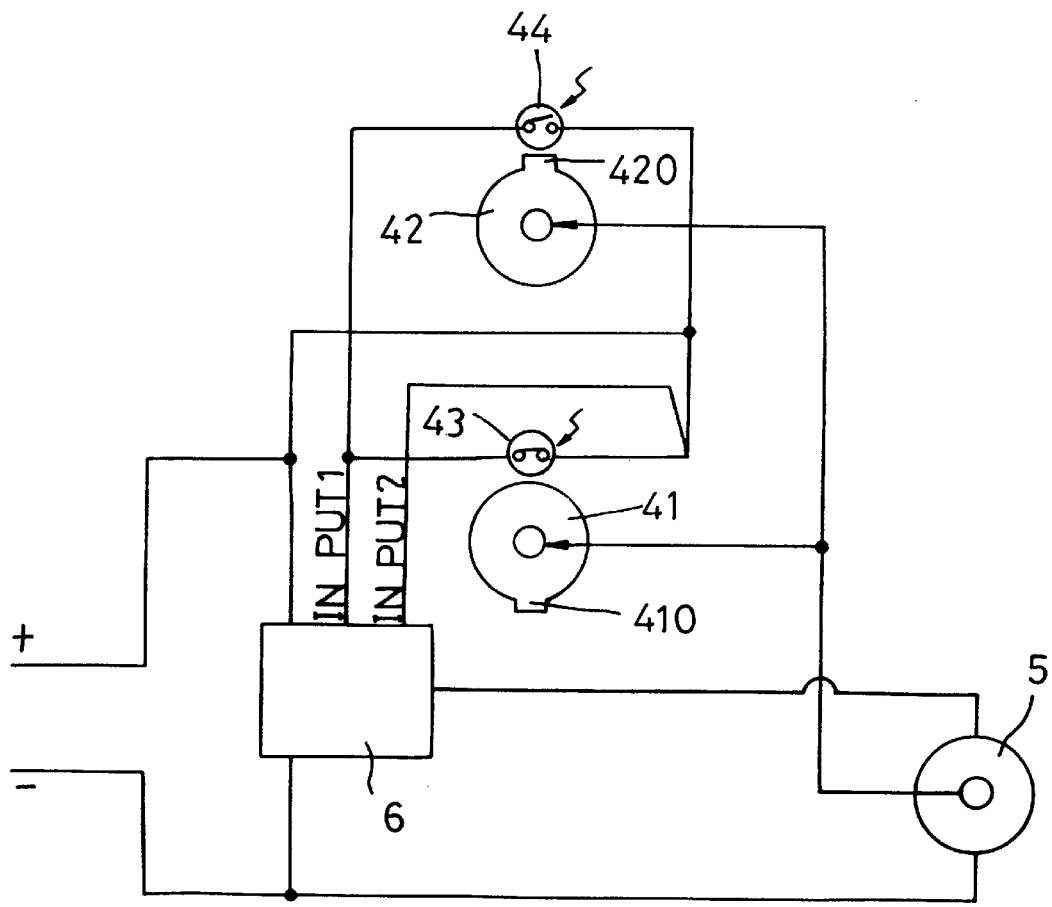

In using, as shown in FIGS. 3 and 4, firstly turn a time set button for setting baking time for one side of the baking frame 3, and turn on to operate baking. The time setting button can adjust the switch circuit board to set the time for baking one side of the baking frame. For example, if the time set for baking one side is 30 seconds, then the baking frame 3 with objects being baked is turned over after 30 seconds to let the other side of the baking frame with the objects baked by the set time adjusting switch 6 commanding the motor 5 to operate and rotate the two turning shafts 41 42 in parallel of the control switch device 4, which can turn the baking frame 3.

The turning members 41, 42 have respectively a projection 410, 420 located in 180 degrees to each other, so when the projection 410 of the turning member 41 turns to let the projection 410 face to a sensor 43 (a spring switch or a magnetic switch or a light switch), the sensor 43 senses to cut off, and the time setting adjusting switch circuit board 6 stops supplying power to the motor 5, and therefore the motor 5, the control switch device 4 and the baking frame all stop rotation, with the electric tube 2 being ON to carry on baking. At the same time, the time set adjusting switch circuit board 6 begins again to count time, and supplies power to the motor 5 after 30 seconds. Then the motor 5 once again operates to turn the rotating members 41, 42 of the control switch device 4 and the baking frame 3, with the heating tube 2 cut off to stop temporarily baking until the baking frame is turned for 180 degrees. Then the projection 420 of the rotating member 42 is turned to reach the sensor 44, which senses to cut off, and the time set adjusting switch circuit board 6 once again stops supplying power to the motor 5 and begins to count time. Thus the continual action of the above described is repeated again and again, turning over the baking frame 3 at regular time again and again so that the objects being baked may be evenly baked enough automatically, without need of extending a hand in the baking oven and no danger of burning a hand.

The control switch device 4 has the two rotating members 41 42 connected in parallel, and the projections 410, 420 located in 180 degrees opposite to each other, possible to control the baking frame 3 to turn over for 180 degrees once. At the same time the two rotating members 41, 42 can be set to bake at different time, or four rotating members may be used in parallel, with each projection located to form 90 degrees from each other, controlling the baking frame 3 to turn 90 degrees once.

In this way, the projections may be positioned at different angles to make the baking frame turn in different angles so as to permit objects get baked evenly enough. In baking two sides or in many angles, different times can be set, to turn the motor on and the heating tube off, or the motor off and the heating tube on, preventing objects baked excessively. Or the motor 5 and the heating tube 2 are both turned on for continual rotation for baking a whole chick or the like.

The invention has the following advantages, as understood from the aforesaid description.

1. It automatically turns over the baking frame at set regular time, baking objects being baked get baked evenly, obtaining the best result.
2. It can have various numbers of the rotating members of the control switch device to rotate the baking frame with objects being baked turned for various different angles if needed.

3. It can set different time for baking each side of objects being baked and turned over.

While the preferred embodiment of the invention has been described above, and it will be recognized and understood that various modifications may be made therein and the appended claims are intended to cover all such modifications that may fall within the spirit and scope of the invention.

What is claimed is:

1. A baking oven turning over objects being baked at set regular times comprising a heating tube located in an upper portion of an interior of said baking oven, a baking frame located in an intermediate horizontal portion for clamping objects being baked, said baking frame having a support shaft fixed respectively at two ends, a first one of said two support shaft inserted in a first side wall of said baking oven, a control switch device and a speed reduced motor fixed on a second side wall of said baking oven, said control switch device having plural rotating members extending out for a support shaft of a second end of said baking frame to insert therein, and a time set adjusting circuit board fixed inside said baking oven;

said time set adjusting circuit board turning on and off power at set regular times to control stoppage and operation of said motor and subsequently permitting said control switch device automatically rotate at the set regular times to turn over said baking frame turning one side up and another side down so that the objects may be baked evenly enough to get the best result.

2. The baking oven turning over objects being baked at set regular times as claimed in claim 1, wherein said baking frame is made of a flat plate.

3. The baking oven turning over objects being baked at set regular times as claimed in claim 1, wherein said baking frame is made of a net.

4. The baking oven turning over objects being baked at set regular times as claimed in claim 1, wherein said control switch device has two rotating members in parallel inside, said rotating members respectively having a projecting in an opposite direction and a sensor to face each said rotating members.

5. The baking oven turning over objects being baked at set regular times as claimed in claim 4, wherein said control switch device has more than two rotating members in parallel inside so as to turn said baking frame for various different angles for baking for a set regular time.

6. The baking oven turning over objects being baked at set regular times as claimed in claim 4, wherein said sensors are spring switches.

7. The baking oven turning over objects being baked at set regular times as claimed in claim 4, wherein said sensors are magnetic switches.

8. The baking oven turning over objects being baked at set regular times as claimed in claim 4, wherein said sensors are photo-electric switches.

* * * * *